(12) United States Patent
Grebien et al.

(10) Patent No.: US 11,181,070 B2
(45) Date of Patent: Nov. 23, 2021

(54) CYLINDER BLOCK OF INTERNAL COMBUSTION ENGINE

(71) Applicant: Caterpillar Motoren GmbH & Co. KG, Kiel (DE)

(72) Inventors: Jan Grebien, Molfsee (DE); Volker Abraham, Kiel (DE); Frank Witt, Bordesholm (DE); Marco Petersen, Schacht-Audorf (DE); Paul Mlynarczyk, Tolk (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 35 days.

(21) Appl. No.: 16/331,891

(22) PCT Filed: Oct. 13, 2017

(86) PCT No.: PCT/EP2017/076256
§ 371 (c)(1),
(2) Date: Mar. 8, 2019

(87) PCT Pub. No.: WO2018/073133
PCT Pub. Date: Apr. 26, 2018

(65) Prior Publication Data
US 2019/0211775 A1 Jul. 11, 2019

(30) Foreign Application Priority Data
Oct. 17, 2016 (GB) .................................... 1617546

(51) Int. Cl.
*F16C 9/02* (2006.01)
*F02F 7/00* (2006.01)
(52) U.S. Cl.
CPC .......... *F02F 7/0053* (2013.01); *F02F 7/0095* (2013.01); *F16C 9/02* (2013.01);
(Continued)

(58) Field of Classification Search
CPC ....... F02F 7/0053; F16C 9/02; F16C 2360/22; F16C 17/10; F16C 17/102; F16C 17/105; F16C 17/107; F16C 35/02; F16M 1/025
See application file for complete search history.

(56) References Cited

U.S. PATENT DOCUMENTS 3,117,498 A 1/1964 Johnson et al.
4,189,193 A * 2/1980 Schumacher ............. F16C 9/02
384/432

(Continued)

FOREIGN PATENT DOCUMENTS

CN 101135277 A 3/2008
DE 10028162 A1 12/2001
(Continued)

OTHER PUBLICATIONS

Chamfer or Fillet: It's More Than a Coin Toss. PDF.Engineering.com, 2016 [Retrieved on Jun. 3, 2020] Retrieved from Internet: <URL:https://www.engineering.com/AdvancedManufacturing/ArticleID/12682/Chamfer-or-Fillet-Its-More-Than-a-Coin-Toss.aspx (Year: 2016).*

(Continued)

*Primary Examiner* — Michael A Kessler

(57) ABSTRACT

A cylinder block of an engine is provided. The cylinder block includes a cast body defining one or more cylindrical bores. The cylinder block also includes a crankshaft bearing wall formed within the cast body. The crankshaft bearing wall is configured to be removably coupled with a bearing cap to define an opening for rotatably supporting a crankshaft of the engine. The cylinder block further includes a chamfered shoulder portion casted on the crankshaft bearing wall.

13 Claims, 5 Drawing Sheets

(52) U.S. Cl.
CPC ......... *F02F 7/0007* (2013.01); *F02F 2200/06* (2013.01); *F16C 2360/22* (2013.01)

(56) References Cited

U.S. PATENT DOCUMENTS

| | | | |
|---|---|---|---|
| 5,107,809 A | | 4/1992 | Suh |
| 5,509,387 A | | 4/1996 | Kaminski et al. |
| 6,158,402 A | * | 12/2000 | Taguchi ................ F02B 75/221 123/53.1 |
| 6,203,203 B1 | | 3/2001 | Schaefer |
| 7,629,057 B2 | | 12/2009 | Oda et al. |
| 7,987,569 B2 | | 8/2011 | Cadle et al. |
| 8,419,285 B2 | | 4/2013 | Ishigo et al. |
| 9,011,012 B2 | | 4/2015 | Hoshikawa et al. |
| 2010/0300244 A1 | * | 12/2010 | Gibby ..................... F16C 33/08 74/579 R |
| 2011/0048367 A1 | | 3/2011 | Zielke et al. |
| 2016/0084303 A1 | * | 3/2016 | Ikeda ..................... B60K 17/24 384/582 |
| 2017/0082147 A1 | * | 3/2017 | Hager ..................... H02K 9/22 |
| 2017/0284335 A1 | * | 10/2017 | Suzuki ................. F02F 7/0021 |

FOREIGN PATENT DOCUMENTS

| | | | | |
|---|---|---|---|---|
| GB | 1009977 A | | 11/1965 | |
| GB | 1395625 A | * | 5/1975 | ............ F02F 7/0053 |
| GB | 1395625 A | | 5/1975 | |
| GB | 1603957 A | | 12/1981 | |
| JP | 2004-162636 A | | 6/2004 | |
| JP | 3-599178 B2 | | 12/2004 | |
| JP | 2013-083313 A | | 5/2013 | |

OTHER PUBLICATIONS

Chamfer. PDF. Merriam-Webster.com, 2020 [Retrieved on Jun. 3, 2020] Retrieved from Internet: https://www.merriam-webster.com/dictionary/chamfer. (Year: 2020).*

International Search Report for related International Application No. PCT/EP2017/076256; report dated Jan. 17, 2018.

United Kingdom Search Report for related GB Application No. 1617546.5 report dated Mar. 13, 2017.

* cited by examiner

Page of a patent document …

CYLINDER BLOCK OF INTERNAL COMBUSTION ENGINE

CROSS-REFERENCE TO RELATED APPLICATION

This Application is a 35 USC § 371 US National Stage filing of International Application No. PCT/EP2017/076256 filed on Oct. 13, 2017 which claims priority under the Paris Convention to United Kingdom Patent Application No. 1617546.5 filed on Oct. 17, 2016.

TECHNICAL FIELD

The present disclosure relates to internal combustion engines, and more particularly relates to a cylinder block of an internal combustion engine.

BACKGROUND

A cylinder block for an internal combustion engine houses various components of the internal combustion engine including a crankshaft. Typically, the cylinder block is cast as a single unit and machined separately to mount the crankshaft. For example, in some applications, an underside portion of the cylinder block is machined to form a bearing surface and a recess for receiving a bearing member supporting the crankshaft. A bearing cap is fastened to the cylinder block at the bearing surface to hold the bearing member in the recess. Since the underside portion of the cylinder block may be difficult to access, it becomes cumbersome to machine the cylinder block. Further, specialized tools and/or fixtures may be needed to access the underside portion of the cylinder block. This may increase an overall manufacturing time and an overall cost of the internal combustion engine. Additionally, loads are imposed on the crankshaft during operation of the internal combustion engine and are transferred to the cylinder block, which may lead to stress concentration in the cylinder block. This may generate fatigue cracks in the cylinder block, resulting in failure of the internal combustion engine.

U.S. Pat. No. 9,011,012, hereinafter referred to as 'the '012 patent', relates to a bearing cap and a bearing cap assembly. A bearing cap is fastened to a bulkhead of a cylinder block by bolts to support a crankshaft. A pair of protruding parts that enlarge a joint surface between the bearing cap and the bulkhead in a transverse direction of the crankshaft are formed respectively in a pair of side surfaces. A pair of reinforcing parts is positioned between a top surface and the pair of protruding parts, protrudes from the pair of side surfaces in the transverse direction of the crankshaft, and has a protrusion length that is smaller than that of the pair of protruding parts. The stress on the joint portion between the bearing cap and the bulkhead generated by the crankshaft during operation of the internal combustion engine is thereby reduced. However, manufacturing of such bearing cap assembly may be complex and time consuming.

SUMMARY OF THE DISCLOSURE

In one aspect of the present disclosure, a cylinder block of an engine is provided. The cylinder block includes a cast body defining one or more cylindrical bores. The cylinder block also includes a crankshaft bearing wall formed within the cast body. The crankshaft bearing wall is configured to be removably coupled with a bearing cap to define an opening for rotatably supporting a crankshaft of the engine. The cylinder block further includes a chamfered shoulder portion casted on the crankshaft bearing wall.

In another aspect of the present disclosure, an engine is provided. The engine includes a cylinder head and a cast body engaged with the cylinder head. The cast body defines one or more cylindrical bores. The engine also includes a crankshaft bearing wall formed within the cast body. The crankshaft bearing wall is configured to be removably coupled with a bearing cap to define an opening for rotatably supporting a crankshaft. The crankshaft bearing wall includes a first longitudinal coupling portion configured to be coupled with the bearing cap. The crankshaft bearing wall also includes a first lateral coupling portion extending from the first longitudinal coupling portion. The first lateral coupling portion is configured to be coupled with the bearing cap. The engine further includes a first chamfered shoulder portion casted on the crankshaft bearing wall. The first chamfered shoulder portion is formed between the first longitudinal coupling portion and the first lateral coupling portion.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
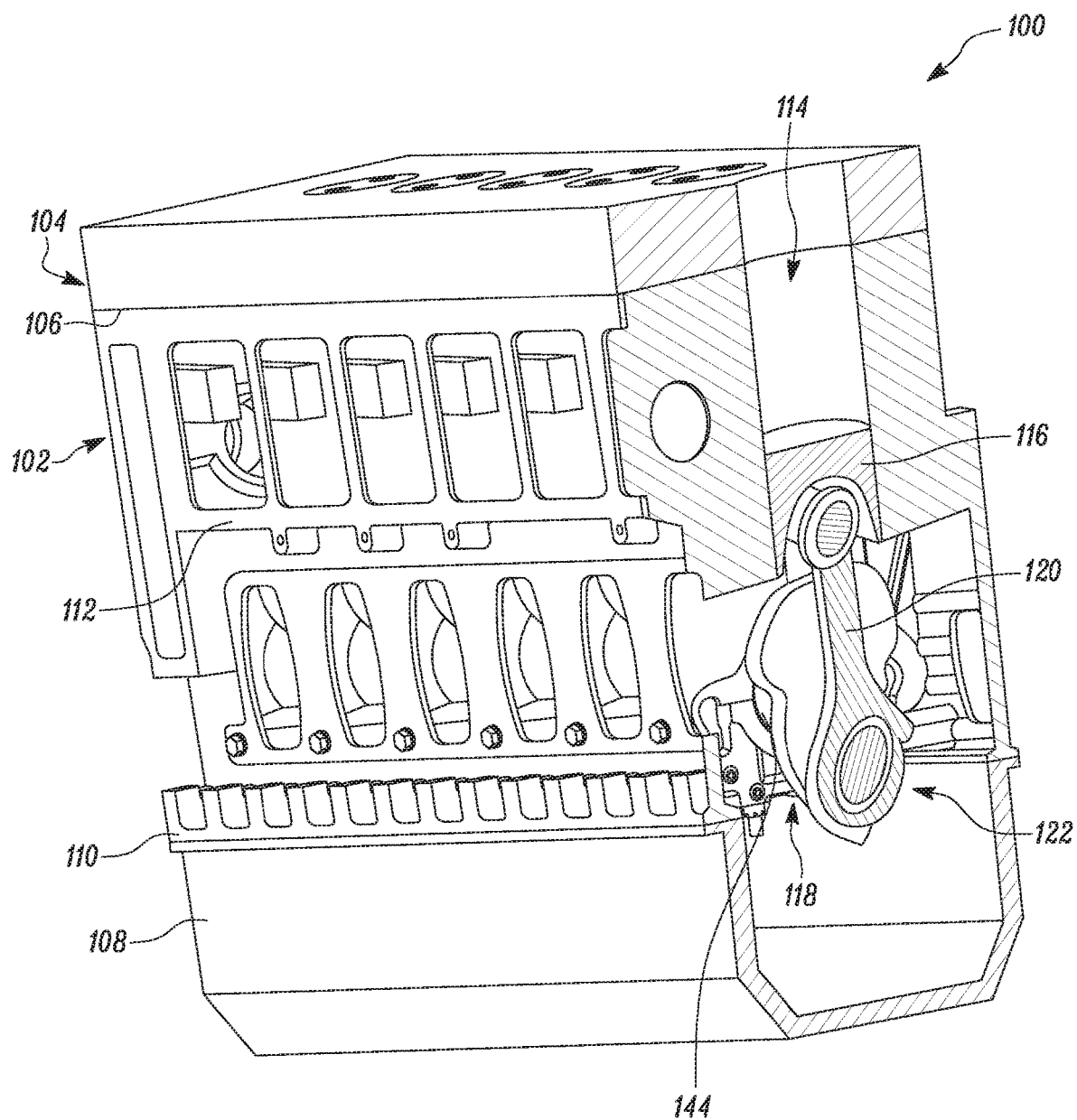
FIG. 1 is a partial sectional view of an engine, according to an embodiment of the disclosure.

FIG. 1 illustrates a partial sectional view of an engine 100, according to an embodiment of the present disclosure. The engine 100 may be embodied as a multi-cylinder internal combustion engine. Alternatively, the engine 100 may be a single-cylinder internal combustion engine. Further, the engine 100 may be a spark-ignited internal combustion engine or a compression-ignited internal combustion engine that may be propelled by one or more of liquid or gaseous fuels. Such fuels may include, but are not limited to, gasoline, diesel, natural gas, petroleum gas, and bio-fuels. The engine 100 may be used to power any machine, such as on-highway trucks or vehicles, off-highway trucks or machines, earth moving equipment, generators, and pumps.

The engine 100 may include a cylinder block 102, a cylinder head 104 coupled at a top end 106 of the cylinder block 102, and an oil pan 108 coupled at a bottom end 110 of the cylinder block 102. The cylinder block 102 includes a cast body 112 defining one or more cylindrical bores 114

(one of which is shown in FIG. 1). In the illustrated embodiment, the cast body 112 defines six cylindrical bores 114 (shown in FIG. 2) in an inline configuration. In other embodiments, the cast body 112 may define fewer or more number of the cylindrical bores 114 in any configuration, such as an in-line configuration, a V-type configuration, and a radial configuration, without departing from the scope of the present disclosure.

At the top end 106 of the cylinder block 102, the cylinder head 104 is mounted on with the cast body 112 for covering each of the cylindrical bores 114, and therefore, defining a main combustion chamber (not shown) in each cylindrical bore 114. At the bottom end 110 of the cylinder block 102, the cast body 112 may be engaged with the oil pan 108 to store fluids associated with lubrication and/or cooling of various components of the engine 100.

In the present embodiment, for explanation purposes, a sectional view of the engine 100 through one of the cylindrical bores 114 is described with reference to FIG. 1. However, the description of the bore 114 provided herein is equally applicable to other cylindrical bores 114 of the engine 100. As shown in FIG. 1, the cylindrical bore 114 is configured to receive a piston 116 of the engine 100. In one embodiment, the cylindrical bore 114 may also receive a cylinder sleeve or a cylinder liner (not shown) along with the piston 116. The piston 116 may be configured to reciprocate within the cylindrical bore 114, and is connected to a crankshaft 118. The piston 116 may be connected to the crankshaft 118 through a connecting rod 120 such that a sliding motion of the piston 116 within the cylindrical bore 114 causes a rotational motion of the crankshaft 118. Further, the crankshaft 118 may be configured to perform the rotational motion within a cavity 122 defined partially by the cast body 112 and partially by the oil pan 108.

Figure 2:
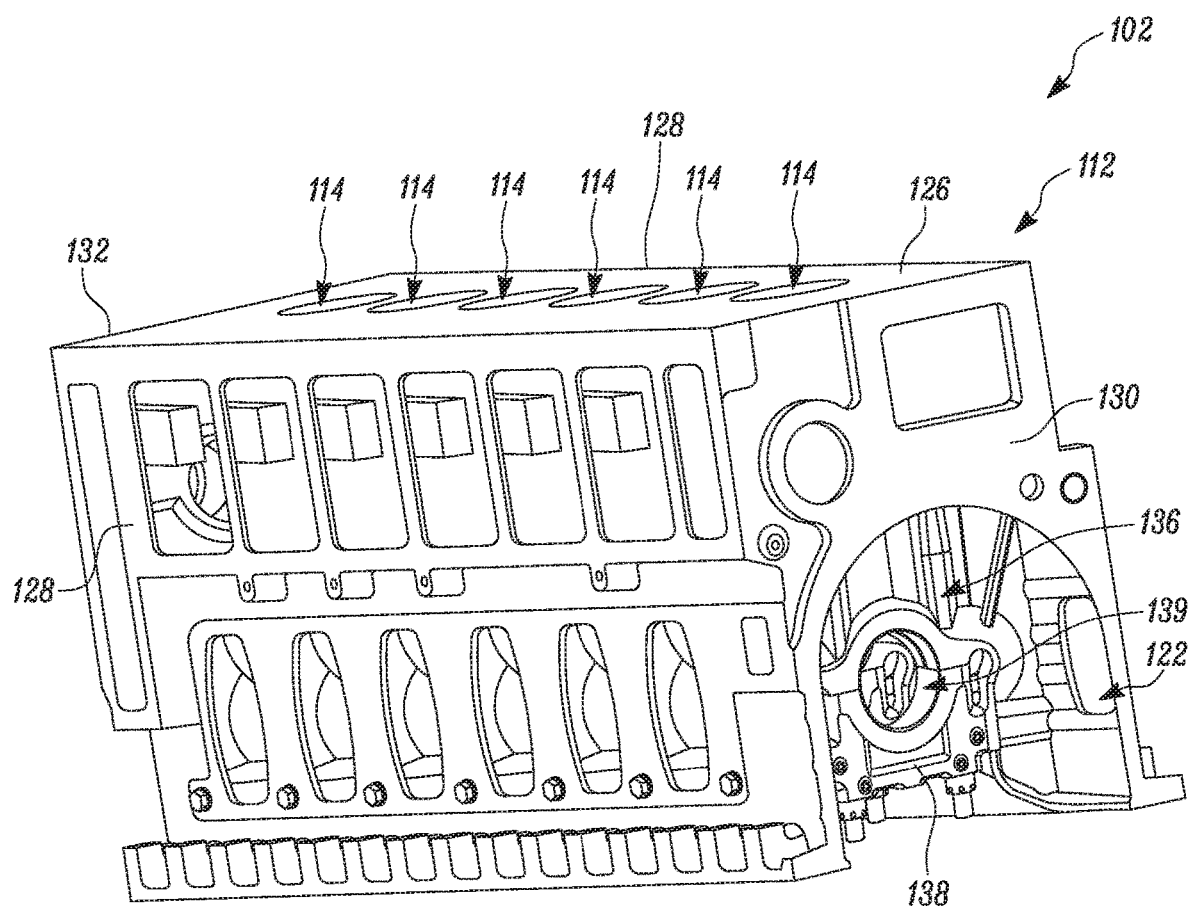
FIG. 2 is a perspective view of a cylinder block of the engine having a crankshaft bearing wall, according to an embodiment of the present disclosure.

FIG. 2 illustrates a perspective view of the cylinder block 102, according to one embodiment of the present disclosure. In the present embodiment, the cast body 112 of the cylinder block 102 may be a one-piece casting. The cast body 112 may be made of materials including, but not limited to, cast iron, aluminium, magnesium, and an alloy thereof.

The cast body 112 includes a top wall 126 from which the cylindrical bores 114 extend, and a pair of sidewalls 128 that partially defines the cavity 122. The cast body 112 further includes a front wall 130 and a rear wall 132 opposite to the front wall 130. In one embodiment, the front wall 130 may be configured to be coupled with a flywheel housing (not shown) of the engine 100 and the rear wall 132 may be configured to be coupled with a transmission housing (not shown) of the engine 100.

In order to support the crankshaft 118 within the cavity 122, a plurality of crankshaft bearing walls 136 is formed within the cast body 112. Only one crankshaft bearing wall 136 is shown in FIG. 2. More specifically, the crankshaft bearing walls 136 are integrally formed with the cast body 112 such that the cylinder block 102 has a unitary construction. The crankshaft bearing walls 136 extend between the pair of sidewalls 128, and are longitudinally spaced from each other along a length of the cast body 112. In an embodiment, the crankshaft bearing walls 136 may also be extending vertically to the top wall 126 for dividing the plurality of cylindrical bores 114. In another embodiment, the crankshaft bearing walls 136 may be independent extending members formed within the cast body 112 in addition to parting walls (not shown) dividing the cylindrical bores 114.

Figure 3:
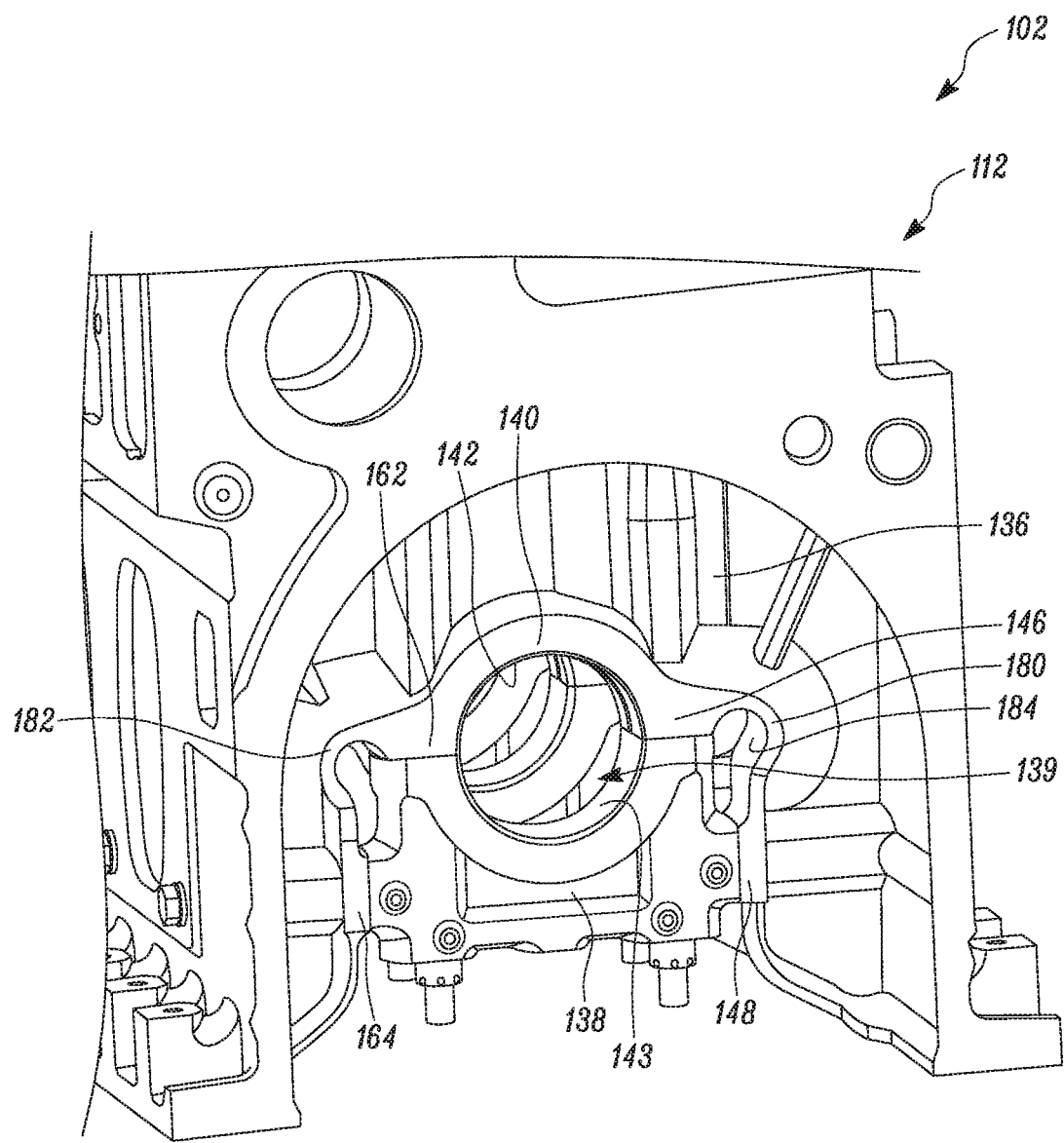
FIG. 3 is a front perspective view of the cylinder block having the crankshaft bearing wall coupled with a bearing cap, according to an embodiment of the disclosure.

FIG. 3 illustrates a front perspective view of a portion of the cylinder block 102 showing a crankshaft bearing wall 136 coupled with a bearing cap 138, according to one embodiment of the present disclosure. For explanation purposes, only one crankshaft bearing wall 136 of the plurality of crankshaft bearing walls 136 is described herein. However, it should be understood that the present disclosure may be equally applicable to other crankshaft bearing walls 136 of the cast body 112, without departing from the scope of the present disclosure. The crankshaft bearing wall 136 is configured to be removably coupled with the bearing cap 138 to define an opening 139 for rotatably supporting the crankshaft 118.

The crankshaft bearing wall 136 includes an arcuate portion 140 having a bearing surface 142 on which a journal 144 (shown in FIG. 1) of the crankshaft 118 is retained. In an embodiment, the bearing surface 142 may be machined to receive a bearing insert (not shown) thereon for retaining the journal 144. In another embodiment, the bearing surface 142 may be machined to directly engage with the journal 144. In an embodiment, the bearing surface 142 has a semi-circular profile. In an embodiment, when the bearing cap 138 is coupled to the crankshaft bearing wall 136, the bearing surface 142 of the crankshaft bearing wall 136 along with a bearing surface 143 of the bearing cap 138 define the circular-shaped opening 139 for receiving the journal 144.

Figure 4:
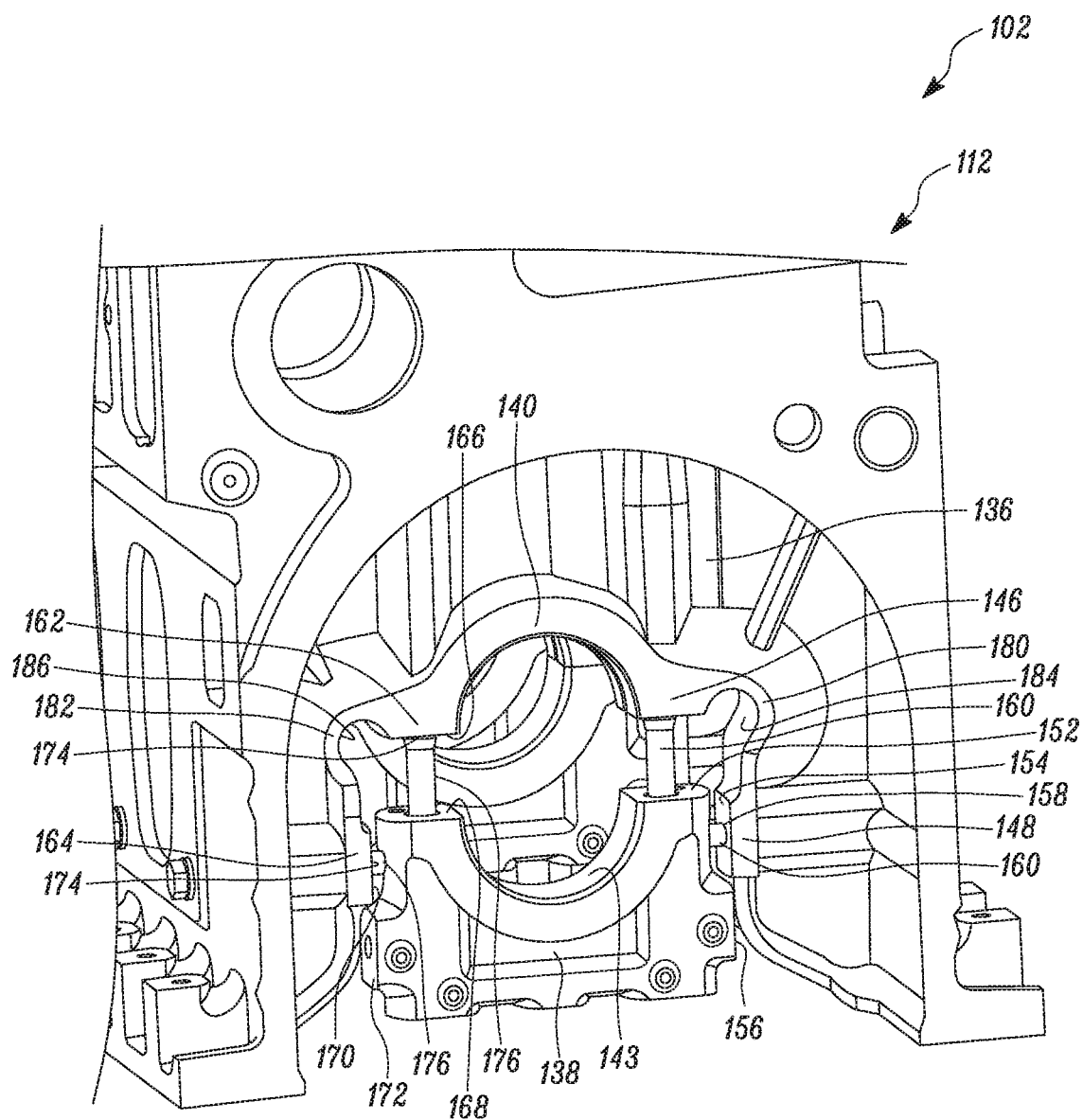
FIG. 4 is an exploded view of the crankshaft bearing wall 136 and the bearing cap, according to an embodiment of the present disclosure.

FIG. 4 illustrates an exploded view of the crankshaft bearing wall 136 and the bearing cap 138, according to one embodiment of the present disclosure. Referring to FIG. 3 and FIG. 4, in order to mount the bearing cap 138 on the crankshaft bearing wall 136, the crankshaft bearing wall 136 includes a first longitudinal coupling portion 146 and a first lateral coupling portion 148 extending from the first longitudinal coupling portion 146. The first longitudinal coupling portion 146 and the first lateral coupling portion 148 are configured to be coupled with the bearing cap 138.

The first longitudinal coupling portion 146 includes a first horizontal machined surface 150 (shown in FIG. 5) configured to engage with a first mating surface 152 of the bearing cap 138. The first lateral coupling portion 148 includes a first vertical machined surface 154 configured to engage with a second mating surface 156 of the bearing cap 138. Further, each of the first longitudinal coupling portion 146 and the first lateral coupling portion 148 includes a first set of holes 158 for receiving a first set of fastening members 160 to couple the bearing cap 138 with the crankshaft bearing wall 136. Although in the illustrated embodiment the first longitudinal coupling portion 146 and the first lateral coupling portion 148 are shown to include one hole 158 each, it is understood that more than one hole may be present in each of the first longitudinal coupling portion 146 and the first lateral coupling portion 148. Further, in various embodiments, one of the first longitudinal coupling portion 146 and the first lateral coupling portion 148 may include the first set of holes 158. In various embodiments, the first set of holes 158 of the first longitudinal coupling portion 146 and the first lateral coupling portion 148 may be threaded holes configured to engage with threaded portions of the respective first set of fastening members 160.

The crankshaft bearing wall 136 also includes a second longitudinal coupling portion 162 and a second lateral coupling portion 164 extending from the second longitudinal coupling portion 162. The second longitudinal coupling portion 162 and the second lateral coupling portion 164 are configured to be coupled with the bearing cap 138 to define the opening 139 for rotatably supporting the crankshaft 118. In an embodiment, the first and second longitudinal coupling portions 146, 162 are symmetrically positioned opposite to each other with respect to the arcuate portion 140, and the first and second lateral coupling portions 148, 164 are symmetrically positioned opposite to each other with respect to the arcuate portion 140.

The second lateral coupling portion 164 includes a second horizontal machined surface 166 extending from the bearing surface 142 opposite to the first horizontal machined surface 150. The second horizontal machined surface 166 is configured to engage with a third mating surface 168 of the bearing cap 138. Further, the second lateral coupling portion 164 includes a second vertical machined surface 170 configured to engage with a fourth mating surface 172 of the bearing cap 138.

Each of the second longitudinal coupling portion 162 and the second lateral coupling portion 164 includes a second set of holes 174 for receiving a second set of fastening members 176 to couple the bearing cap 138 with the crankshaft bearing wall 136. Although in the illustrated embodiment the second longitudinal coupling portion 162 and the second lateral coupling portion 164 are shown to include one hole 158 each, it is understood that more than one hole may be present in each of the second longitudinal coupling portion 162 and the second lateral coupling portion 164. Further, in various embodiments, one of the second longitudinal coupling portion 162 and the second lateral coupling portion 164 may include the second set of holes 158. In various embodiments, the second set of holes 174 of the second longitudinal coupling portion 162 and the second lateral coupling portion 164 may be threaded holes configured to engage with threaded portions of the respective fastening members 176.

Figure 5:
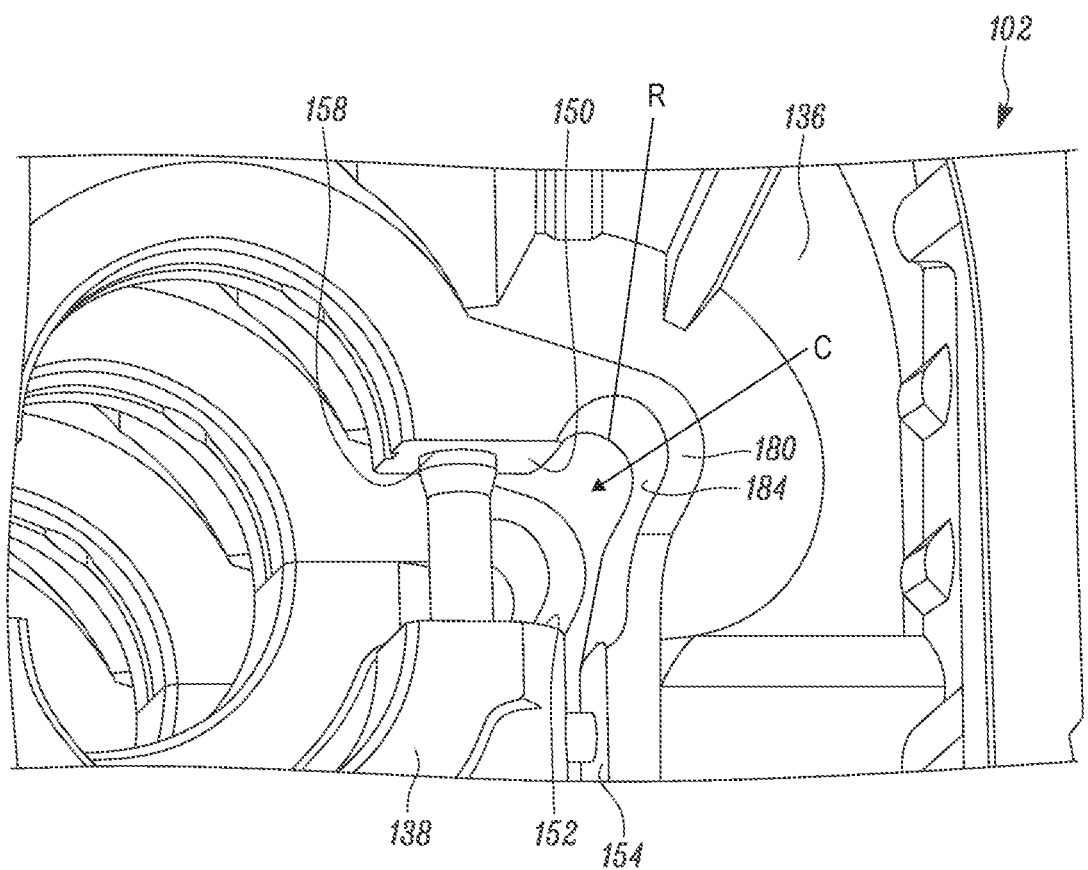
FIG. 5 is a front view of a portion of the cylinder block showing a first chamfered shoulder portion, according to an embodiment of the present disclosure.

The crankshaft bearing wall 136 further includes a first chamfered shoulder portion 180 casted on the crankshaft bearing wall 136. The first chamfered shoulder portion 180 is formed between the first longitudinal coupling portion 146 and the first lateral coupling portion 148. As shown in FIG. 5, the chamfered shoulder portion is defined by surfaces 180 and 184, and is a "shoulder portion" in that it extends around a corner of the bearing cap 138 in its assembled position (FIG. 3). It is "chamfered" in that the surface which reference number 180 points, in FIG. 5, is a chamfer. The "chamfered surface 184" is "chamfered" in that it terminates at the same surface to which reference numeral 180 points, in FIG. 5, which is a chamfer. In the illustrated embodiment, the claimed "chamfered shoulder portion" 180 defines a radiused gap that extends around the corner of the bearing cap as shown in FIG. 3. The gap is generally keyhole-shaped with a rounded aperture at the top and a narrower part below. In an embodiment, a second chamfered shoulder portion 182 may also be casted on the crankshaft bearing wall 136 between the second longitudinal coupling portion 162 and the second lateral coupling portion 164. In an embodiment, the first chamfered shoulder portion 180 and the second chamfered shoulder portion 182 may be identical to each other.

The first chamfered shoulder portion 180 and the second chamfered shoulder portion 182 may include a first chamfered surface 184 and a second chamfered surface 186, respectively. The first chamfered surface 184 may be tangential to the first horizontal machined surface 150 and the first vertical machined surface 154. Further, the second chamfered surface 186 may be tangential to the second horizontal machined surface 166 and the second vertical machined surface 170.

FIG. 5 illustrates an enlarged view of a portion of the crankshaft bearing wall 136 showing the first chamfered shoulder portion 180, according to one embodiment of the present disclosure. For explanation purposes, only the first chamfered shoulder portion 180 is described herein below, however, it is understood that description of the first chamfered shoulder portion 180 provided herein may be equally applicable to the second chamfered shoulder portion 182, without departing from the scope of the present disclosure.

The first chamfered shoulder portion 180 has a substantially convex shape having a predefined radius 'R'. In an example, the first chamfered shoulder portion 180 may have any other curvilinear shape having a varying radius. For example, the first chamfered shoulder portion 180 may have a varying radius along a length thereof. In the illustrated embodiment, the first chamfered shoulder portion 180 has a semi-circular shape. Further, the substantially convex shape or the predefined radius 'R' may be determined, based on various constructional, operational and geometrical parameters of the crankshaft bearing wall 136, the crankshaft 118, and the cast body 112. In an embodiment, the predefined radius 'R' is less than 51 mm. Although in the present embodiment, the predefined radius 'R' is less than 51 mm, it is understood that the predefined radius 'R' may alternatively be more than 51 mm, without departing from the scope of the present disclosure.

The first chamfered shoulder portion 180 defines a clearance 'C' between the crankshaft bearing wall 136 and the bearing cap 138. In an embodiment, the first chamfered shoulder portion 180 has a predefined radius 'R' such that the clearance 'C' between the crankshaft bearing wall 136 and the bearing cap 138 corresponds to the predefined radius 'C'.

Although in the illustrated embodiment the first chamfered shoulder portion 180 and the second chamfered shoulder portion 182 are shown to be identical to each other, it should be understood that the second chamfered shoulder portion 182 may have different dimensional, geometrical, and/or constructional characteristics from those of the first chamfered shoulder portion 180. In one example, the second chamfered shoulder portion 182 may have a radius greater than or equal to the predefined radius 'R'. In another example, the second chamfered shoulder portion 182 may have a shape different from the shape of the first chamfered shoulder portion 180.

INDUSTRIAL APPLICABILITY

The present disclosure relates to any internal combustion engine in which the crankshaft 118 is rotatably mounted on the cylinder block 102 using the bearing cap 138. The cylinder block 102 of the engine 100 may be made by any type of casting process. The crankshaft bearing wall 136 of the cylinder block 102 may be integrally formed in the cast body 112 of the cylinder block 102 during casting. The first chamfered shoulder portion 180 and the second chamfered shoulder portion 182 may also integrally formed within the crankshaft bearing wall 136 during casting. Therefore, as the cylinder block 102 may be manufactured as a single piece casting, other processing and/or fabrication operations may be avoided, thereby minimizing a manufacturing time of the cylinder block 102.

Further, the first chamfered shoulder portion 180 and the second chamfered shoulder portion 182 may help in reducing surface contact with the bearing cap 138, thereby reducing stress concentration in the crankshaft bearing wall 136. Furthermore, dimensions of the first chamfered shoulder portion 180 and the second chamfered shoulder portion 182 may be suitably selected based on specific requirements of the bearing cap 138 of the engine 100. For example, the predefined radius 'R' of the first chamfered shoulder portion 180 and the radius of the second chamfered shoulder portion 182 may be varied, based on a type, a size, and a dimension of the bearing cap 138.

Additionally, in order to mount different types of the crankshaft 118, one or more of the first horizontal machined surface 150, the second horizontal machined surface 166, the first vertical machined surface 154, and the second vertical machined surface 170 may be suitably machined to engage with different types of bearing caps. Therefore, a manufacturer may be imparted with flexibility to produce the cylinder block 102 to mount various crankshaft types.

While aspects of the present disclosure have been particularly shown and described with reference to the aspects above, it will be understood by those skilled in the art that various additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

The invention claimed is:

1. A cylinder block of an engine, the cylinder block comprising: a cast body defining one or more cylindrical bores; a crankshaft bearing wall formed within the cast body having a first longitudinal coupling portion including a first machined surface defining a first hole for receiving a first fastening member, and a first lateral coupling portion including a second machined surface defining a second hole for receiving a second fastening member, the crankshaft bearing wall configured to be removably coupled at the first and second machined surfaces with a bearing cap to define an opening for rotatably supporting a crankshaft of the engine; and a chamfered shoulder portion having a chamfered surface defining a keyhole shaped radiused gap formed between the first longitudinal coupling portion, and the first lateral coupling portion, and the bearing cap, the chamfered surface tangential to the first and second machined surfaces, and said chamfered shoulder portion casted on the crankshaft bearing wall.

2. The cylinder block of claim 1, wherein the chamfered shoulder portion defines a clearance between the crankshaft bearing wall and the bearing cap.

3. The cylinder block of claim 2, wherein the chamfered shoulder portion has a predefined radius such that the clearance between the crankshaft bearing wall and the bearing cap corresponds to the predefined radius.

4. The cylinder block of claim 3, wherein the predefined radius is between 1 mm and 51 mm.

5. The cylinder block of claim 1, wherein the crankshaft bearing wall comprises:
the first longitudinal coupling portion configured to be coupled with the bearing cap to define the opening for rotatably supporting the crankshaft of the engine; and
the first lateral coupling portion extending from the first longitudinal coupling portion, the first lateral coupling portion configured to be coupled with the bearing cap, wherein the chamfered shoulder portion is formed between the first longitudinal coupling portion and the first lateral coupling portion.

6. The cylinder block of claim 5, wherein the crankshaft bearing wall comprises:
a second longitudinal coupling portion configured to be coupled with the bearing cap to define the opening for rotatably supporting the crankshaft of the engine; and
a second lateral coupling portion extending from the second longitudinal coupling portion, the second lateral coupling portion configured to be coupled with the bearing cap, wherein a chamfered shoulder portion is formed between the second longitudinal coupling portion and the second lateral coupling portion.

7. The cylinder block of claim 6, wherein the second longitudinal coupling portion and the second lateral coupling portion comprises a third hole and a fourth hole, respectively, for receiving a third fastening member and a fourth fastening member, respectively, to couple the bearing cap with the crankshaft bearing wall.

8. An engine comprising: a bearing cap; a cylinder head; a cast body engaged with the cylinder head, the cast body defining one or more cylindrical bores; a crankshaft bearing wall formed within the cast body, the crankshaft bearing wall configured to be removably coupled with a bearing cap to define an opening for rotatably supporting a crankshaft, the crankshaft bearing wall comprising: a first longitudinal coupling portion including a first machined surface defining a first hole for receiving a first fastening member configured to be coupled with the bearing cap; and a first lateral coupling portion extending from the first longitudinal coupling portion, the first lateral coupling portion including a second machined surface defining a second hole for receiving a second fastening member configured to be coupled with the bearing cap; and a first chamfered shoulder portion casted on the crankshaft bearing wall, the first chamfered shoulder portion comprising a chamfered surface defining a keyhole shaped radiused gap being formed between the first longitudinal coupling portion, the first lateral coupling portion, and the bearing cap; and the chamfered surface is tangential to the first and second machined surfaces.

9. The engine of claim 8, wherein the first chamfered shoulder portion defines a clearance between the crankshaft bearing wall and the bearing cap.

10. The engine of claim 9, wherein the first chamfered shoulder portion has a predefined radius such that the clearance between the crankshaft bearing wall and the bearing cap corresponds to the predefined radius.

11. The engine of claim 10, wherein the predefined radius is less than 51 mm.

12. The engine of claim 8, wherein the crankshaft bearing wall comprises:
a second longitudinal coupling portion configured to be coupled with the bearing cap to define the opening for rotatably supporting the crankshaft of the engine; and
a second lateral coupling portion extending from the second longitudinal coupling portion, the second lateral coupling portion configured to be coupled with the bearing cap, wherein a second chamfered shoulder portion is formed between the second longitudinal coupling portion and the second lateral coupling portion.

13. The engine of claim 12, wherein each of the second longitudinal coupling portion and the second lateral coupling portion comprises a third hole and a fourth hole, respectively, for receiving a third fastening member and a fourth fastening member, respectively, to couple the bearing cap with the crankshaft bearing wall.

* * * * *